US012066070B2

(12) United States Patent
Henning

(10) Patent No.: US 12,066,070 B2
(45) Date of Patent: Aug. 20, 2024

(54) DISC BRAKE FOR A COMMERCIAL VEHICLE

(71) Applicant: WABCO Europe BVBA, Brussels (BE)

(72) Inventor: Paul Henning, Schwetzingen (DE)

(73) Assignee: ZF CV Systems Europe BV, Brussels (BE)

(*) Notice: Subject to any disclaimer, the term of this patent is extended or adjusted under 35 U.S.C. 154(b) by 129 days.

(21) Appl. No.: 17/117,326

(22) Filed: Dec. 10, 2020

(65) Prior Publication Data

US 2021/0172487 A1 Jun. 10, 2021

(30) Foreign Application Priority Data

Dec. 10, 2019 (EP) .................................... 19214814

(51) Int. Cl.
*F16D 55/00* (2006.01)
*F16D 55/226* (2006.01)
(Continued)

(52) U.S. Cl.
CPC ....... *F16D 65/0068* (2013.01); *F16D 55/226* (2013.01); *F16D 65/0087* (2013.01); *F16D 65/095* (2013.01); *F16D 65/12* (2013.01); *F16D 65/18* (2013.01); *F16D 2055/0016* (2013.01); *F16D 2200/003* (2013.01)

(58) Field of Classification Search
CPC .. F16D 55/226; F16D 65/0068; F16D 65/087; F16D 65/095; F16D 65/18; F16D 2055/0016; F16D 2125/26; F16D 2125/28; F16D 65/097; F16D 65/0972
See application file for complete search history.

(56) References Cited

U.S. PATENT DOCUMENTS 3,997,034 A * 12/1976 Kellogg ............ F16D 55/22655 188/73.1
4,174,769 A * 11/1979 Gerard .................. F16D 65/097 188/73.32
(Continued)

FOREIGN PATENT DOCUMENTS

CN 105593556 A 5/2016
DE 2255678 A1 5/1974
(Continued)

*Primary Examiner* — Nicholas J Lane
(74) *Attorney, Agent, or Firm* — Dickinson Wright PLLC

(57) ABSTRACT

A disc brake for commercial vehicle includes a brake caliper and brake pads for clamping the brake disc. The brake caliper has a first inside space with an opening on a side facing the brake disc for receiving a clamping device, and the brake caliper has a second inside space for receiving the brake disc. The brake caliper and brake pads have advantages in terms of installation space and is lightweight and reduces production costs. The brake caliper includes clamping-side lugs and reaction-side lugs. The lugs on each side define a channel for receiving the brake pads for each side. The brake pads include supporting surfaces and bearing surfaces on their perimeter that correspond to the arrangement of the lugs. The lugs on the clamping side define an L-shape. The axial length of supporting surfaces of the clamping side brake pad is shorter than that of the clamping-side lugs.

19 Claims, 6 Drawing Sheets

(51) Int. Cl.

| | |
|---|---|
| ***F16D 65/00*** | (2006.01) |
| ***F16D 65/095*** | (2006.01) |
| ***F16D 65/12*** | (2006.01) |
| ***F16D 65/18*** | (2006.01) |

(56) References Cited

U.S. PATENT DOCUMENTS

| | | | | |
|---|---|---|---|---|
| 4,856,620 | A * | 8/1989 | Thiel | F16D 65/0978 188/73.39 |
| 4,878,564 | A * | 11/1989 | Kondo | F16D 65/092 188/73.31 |
| 5,172,792 | A * | 12/1992 | Cartwright | F16D 65/092 188/71.8 |
| 5,947,234 | A * | 9/1999 | Shimazaki | F16D 65/0977 188/73.38 |
| 5,979,611 | A * | 11/1999 | Sasaki | F16D 65/0977 188/73.43 |
| 2004/0154882 | A1* | 8/2004 | Vezzoli | F16D 65/0972 188/73.38 |
| 2004/0188188 | A1* | 9/2004 | Barbosa | F16D 65/095 188/73.31 |
| 2004/0238292 | A1* | 12/2004 | Ortegren | F16D 55/227 188/71.1 |
| 2005/0173205 | A1* | 8/2005 | Bach | F16D 55/226 188/73.39 |
| 2005/0230197 | A1* | 10/2005 | Jedele | F16D 55/227 188/73.32 |
| 2005/0284710 | A1* | 12/2005 | Roberts | F16D 65/092 188/73.31 |
| 2006/0289249 | A1* | 12/2006 | Nishimura | F16D 55/226 188/72.4 |
| 2007/0051568 | A1* | 3/2007 | Barbosa | F16D 55/227 188/73.45 |
| 2007/0084681 | A1* | 4/2007 | Roberts | F16D 55/226 188/79.51 |
| 2007/0119665 | A1 | 5/2007 | Barbosa et al. | |
| 2013/0133999 | A1* | 5/2013 | Ishiguro | B23C 3/00 409/132 |
| 2015/0068853 | A1* | 3/2015 | Naito | F16D 65/0971 188/72.4 |

FOREIGN PATENT DOCUMENTS

| | | | |
|---|---|---|---|
| DE | 102012016712 | A1 | 2/2014 |
| DE | 102012016735 | A1 | 2/2014 |
| DE | 102015209818 | A1 | 6/2016 |
| DE | 102016010301 | A1 | 3/2018 |
| DE | 102017001089 | A1 | 8/2018 |
| DE | 102017105641 | A1 | 9/2018 |
| DE | 102017004436 | A1 | 11/2018 |
| EP | 0412541 | A1 | 2/1991 |
| EP | 1610025 | A1 | 12/2005 |
| JP | H08105467 | A | 4/1996 |
| WO | 2005064191 | A1 | 7/2005 |
| WO | 2005064193 | A1 | 7/2005 |
| WO | 2005064194 | A1 | 7/2005 |
| WO | 2010010583 | A1 | 1/2010 |
| WO | 2013121395 | A1 | 8/2013 |

* cited by examiner

DISC BRAKE FOR A COMMERCIAL VEHICLE

FIELD

The present disclosure relates to a disc brake. More particularly, the present disclosure relates to a disc brake for a commercial vehicle, having a brake caliper and brake pads which clamp a brake disc, where the brake caliper has a first inside space with an opening on the side facing a brake disc for receiving a clamping device, and the brake caliper has a second inside space for receiving the brake disc.

BACKGROUND

Disc brakes for commercial vehicle are known, for example, from DE 10 2012 016 712 A1. The disc brake has a brake caliper for a sliding caliper disc brake. By way of two bolt guides inset in the brake caliper, the brake caliper slides axially in the direction of the brake disc on guide bolts of a brake carrier of the disc brake and clamps the brake disc during a braking operation. The brake carrier has two brake pad channels located opposite one another for the receiving and arrangement of the brake pads. The brake pads are guided and supported in the brake carrier so as to be axially displaceable. The brake pads are held by a pad retaining clip and by retaining springs. A disadvantage of brake carriers for commercial vehicles, in particular for heavy commercial vehicles, is their high inherent weight of at least 9 kg. Within the first inside space there is arranged an actuator in the form of a clamping device, which clamps the clamping-side brake pad via the opening of the first inside space. Current clamping devices require a large amount of installation space in the brake caliper for their arrangement. The clamping side is defined as the side of the disc brake on which the clamping device is arranged in the disc brake. The reaction side is defined as the side of the disc brake opposite the clamping side. For correcting pad wear of the brake pads, the clamping device of the disc brake has an adjusting device. The adjusting device is designed to keep a clearance, that is to say the distance between the brake pad and the brake disc, constant. In modern disc brakes, adjustment takes place automatically. The adjusting device, like the clamping device, is arranged in the first inside space of the brake caliper or in an additional inside space of the brake caliper in the form of a box core, so that the brake caliper must have sufficiently large axial and radial dimensions to receive the clamping device and the adjusting device.

New brake concepts tend towards a narrower structural form of the clamping device. The narrow structural form of the clamping device is the result of reduced pad thicknesses of the brake pads, which permit an axial arrangement with the same installation length as clamping and adjusting devices arranged in parallel. Such a clamping unit with reduced installation space is shown, for example, in DE 10 2017 004 436 A1.

SUMMARY

The object of the present disclosure is to provide a disc brake having a brake caliper and brake pads which provides advantages in terms of installation space, is lightweight, and reduces production costs.

The object is achieved by arranging lugs for receiving brake pads in a second inside space of a brake caliper of a disc brake. By the arrangement of the lugs within the brake caliper, the brake carrier for receiving the brake pads can be omitted, so that the overall weight of the disc brake and the production costs are reduced. With the omission of the brake carrier, installation space is additionally freed within a vehicle, and this additionally freed space can be used in other ways. Further advantages include reduced dimensions of the disc brake for transport purposes and simplified construction during mounting, because additional components, such as the brake carrier, are no longer included. The arrangement of lugs for receiving the brake pads directly in the brake caliper is particularly suitable for a brake caliper that receives, in a first inside space of the brake caliper, a clamping unit that is narrow in width and length and arranged in succession. As a result of the small dimensioning of the clamping unit, additional free space is produced in the brake caliper. The lugs can be arranged in the free space that is additionally available in the brake caliper without having to increase the dimensions of the brake caliper.

In one aspect, two lugs are arranged opposite one another and form a pad carrier channel for receiving the brake pad. A brake pad carrier channel is arranged on the clamping side in the second inside space of the brake caliper of the disc brake. A further brake pad carrier channel is arranged in the second inside space of the brake caliper of the disc brake, in an axially parallel manner with respect to the brake disc, on the reaction side, opposite the clamping side. The pad carrier channel facilitates mounting of the brake pads belonging to the disc brake. Only brake pads of the correct dimensions in terms of size fit into the brake pad carrier channels formed by the lugs. The size of the brake pads is to be understood as being the length, the width and the depth of a brake pad.

In a further aspect, two axial cross-members of the brake pad each have two sub-regions which are located in the direction of the second inside space and are in the form of lugs. More sub-regions from which the lugs are formed are also conceivable on the axial cross-members. The sub-regions on the axial cross-members limit the brake pads in a perpendicular direction relative to the axial axis of the brake caliper without an additional outlay in terms of material. The region of the brake disc run-in and the region of the brake disc run-out remain free of sub-regions that are in the form of lugs.

In a further aspect, the lugs are L-shaped, such that the brake pads are arranged in the brake caliper so as to be secured against canting and twisting. The L-shaped form of the lugs additionally prevents or substantially limits the brake pads from being rotated out of the brake caliper.

In a further aspect, the lugs and the brake caliper are formed from a single component, such that costs in the production process are reduced.

In a further aspect, the brake caliper having the lugs formed from one component is formed from a torsion-resistant cast part or from an aluminum component, which is easy to machine, or a component formed from a composite material, which is also easy to machine. As well as being easy to machine, aluminum and composite materials additionally have a light overall weight relative to other materials. Moreover, the lugs formed from aluminum or composite material can easily be formed from the component, for example by rolling or stamping processes, and reworked.

In a further aspect, the first inside space is configured to receive a clamping device and an adjusting device. The arrangement of the clamping device and the adjusting device axially in succession, and also the arrangement thereof in the first inside space of the brake caliper, requires less installation space in the brake caliper. Accordingly, the first inside space of the brake caliper can be of smaller dimensions and, in addition, installation space is present in the second inside space of the brake caliper for the arrangement of the lugs. Additionally, additional installation space is present for receiving the brake pads in the lugs.

Advantageously, the brake pads have supporting surfaces for arrangement on the lugs. For securing against twisting, the brake pads have, on their perimeter, supporting surfaces which correspond in terms of their dimensions (length and depth or height and depth) to the lugs.

In a further aspect, supporting surfaces of the brake pad lie on the lugs perpendicularly to the axial axis of the brake caliper and lie on the lugs in the radial direction. The supporting surfaces advantageously form a type of coding. The fitting of incorrect brake pads is prevented, because only brake pads in which the supporting surfaces correspond to the lugs of the brake caliper fit into the brake caliper.

In a further aspect, the axial length of the supporting surfaces of the brake pad arranged on the clamping side of the disc brake is smaller than an axial length of the lugs on the clamping side of the brake caliper. The additional length of the lugs on the clamping side of the brake caliper allows the clearance to be adjusted by way of displacement of the brake caliper in the direction of the brake disc. The clearance is defined as the distance between the brake disc and the brake pad.

Furthermore, in a further aspect, the axial length of the lugs on the clamping side of the brake caliper is formed from the sum of the axial length of the clamping-side support surfaces, a degree of wear of the reaction-side brake pad and a degree of wear of the brake disc. The axial length of the lugs on the clamping side of the brake caliper accordingly corresponds to the maximum clearance adjustment of the clamping-side brake pad, and accordingly to the maximum wear of the clamping-side brake pad and the maximum wear of the reaction-side brake pad.

In a further aspect, the brake caliper of the disc brake has, axially, two bolt guides for arrangement on an axle flange on the vehicle. A bolt guide cap is arranged coaxially on each of the two bolt guides for protection against environmental influences and corrosion. The brake caliper of the disc brake is fixed to an axle flange on the vehicle via two bolt screws each arranged in a bolt guide. Further fastening means for arrangement of the disc brake on the axle flange on the vehicle are not necessary.

In a further aspect, the bolt guide caps are arranged on the bolt guides via a screw connection or a clip connection. The screw connection and the clip connection have the advantage of simple fitting and simple removal of the bolt guide caps.

BRIEF DESCRIPTION OF THE DRAWINGS

Selected exemplary embodiments of the invention will be explained herein below by way of the accompanying figures, in which.

DETAILED DESCRIPTION OF THE DRAWINGS

Figure 1:
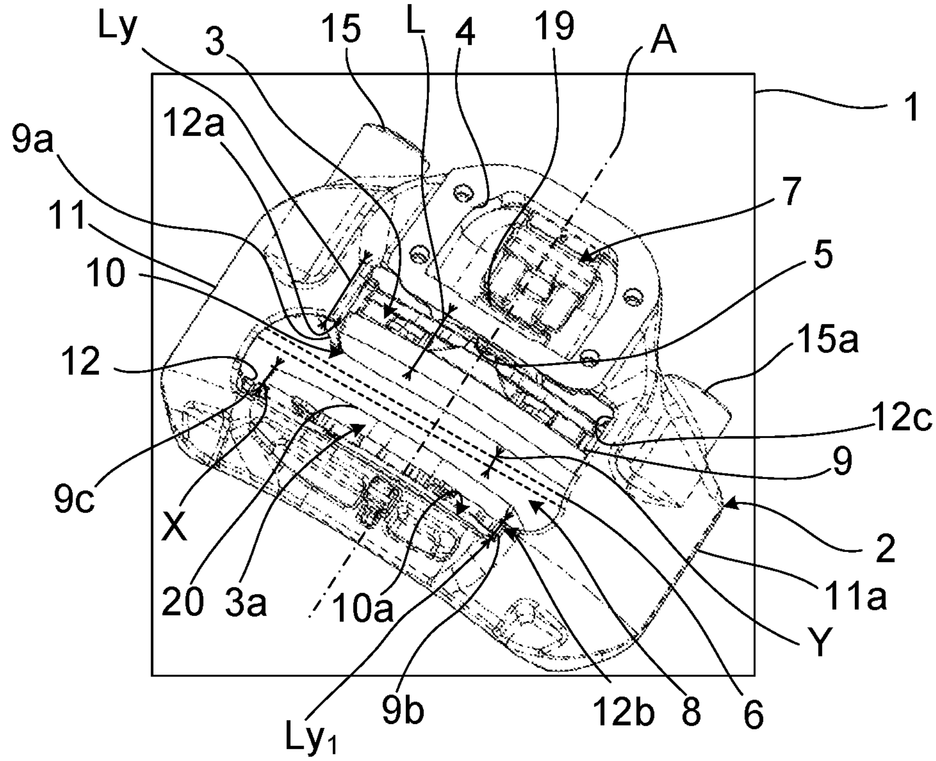
FIG. 1 is a perspective view of a disc brake having a brake caliper with lugs.

FIG. 1 shows a disc brake having a brake caliper 2, according to the present disclosure. In the brake caliper 2, starting from an axial axis A of the brake caliper 2 on the clamping side, a recess in the form of a first inside space 4 is disposed for receiving a clamping device 7 that is arranged axially in succession. The clamping device 7 clamps a brake disc 6 via the clamping-side brake pad 3, the reaction-side brake pad 3*a*, and via an opening 5 that extends axially in the direction of the brake disc 6 and that is provided in the first inside space 4. For receiving a clamping-side brake pad 3 and a reaction-side brake pad 3*a*, and a brake disc 6 arranged between the clamping-side brake pad 3 and the reaction-side brake pad 3*a*, the brake caliper 2 has a second inside space 8. In the direction of the second inside space 8 of the brake caliper 2, sub-regions 12, 12*a* are formed on a first axial cross-member 11 and sub-regions 12*b*, 12*c* are formed on a second axial cross-member 11*a*.

Figure 2A:
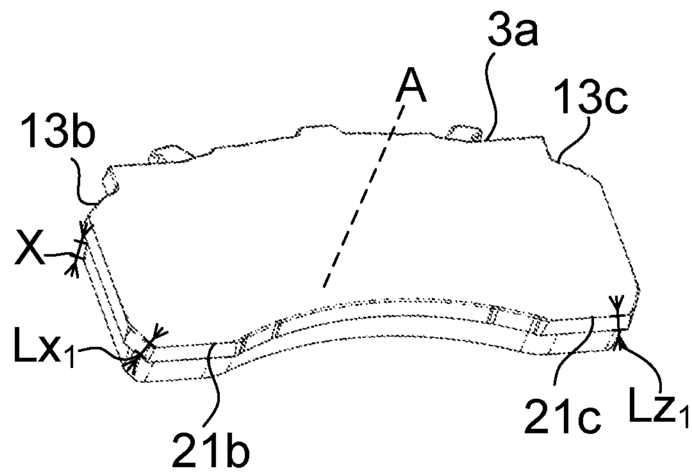
FIG. 2*a* is a perspective view of a reaction-side brake pad of the brake caliper according to FIG. 1.
Figure 3:
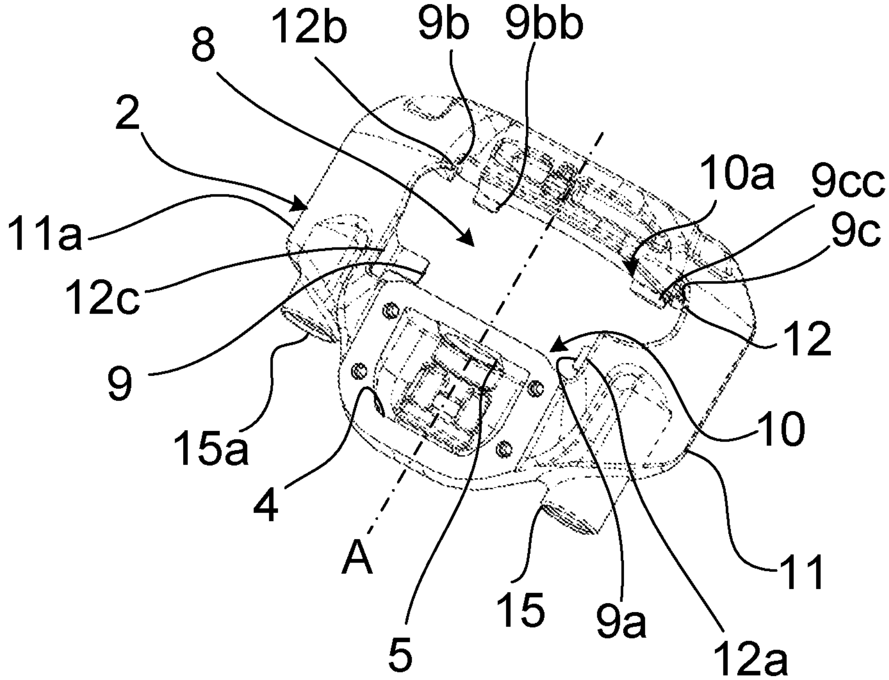
FIG. 3 is a perspective view of the brake caliper of the disc brake according to FIG. 1.

Lugs 9, 9*a*, 9*b*, 9*bb*, 9*c*, 9*cc* are formed from the sub-regions, where the lug 9*bb* and the lug 9*cc* are shown in FIG. 3. The lugs 9, 9*a* are L-shaped and disposed on opposite lateral sides of the axis A, and the lugs 9, 9*a* form a pad carrier channel 10 in the lateral space therebetween for receiving the brake pad 3. Lugs 9*b*, 9*c* are also disposed on opposite lateral sides, and the lugs 9*b*, 9*c* form a pad carrier channel 10*a* in the lateral space therebetween for receiving the brake pad 3*a*. The lugs 9, 9*a* have axially a length Ly in the axial direction, which corresponds to a combination of an axial length L of the brake pad 3 and a pad wear X of the reaction-side brake pad 3*a*. A pad wear X (see FIG. 2*a*) is to be understood as meaning the deterioration of a friction lining 20 of the reaction-side brake pad 3*a*. By lengthening of the lugs 9, 9*a* (relative to the length L of the brake pad 3) by the pad wear X of the brake pad 3*a*, the displacement of the brake caliper 2, and accordingly also the displacement of the brake pad 3, in the direction of the brake disc 6 is taken into consideration, whereby the clamping-side brake pad 3 is prevented from falling out of the brake caliper 2.

Figure 4:
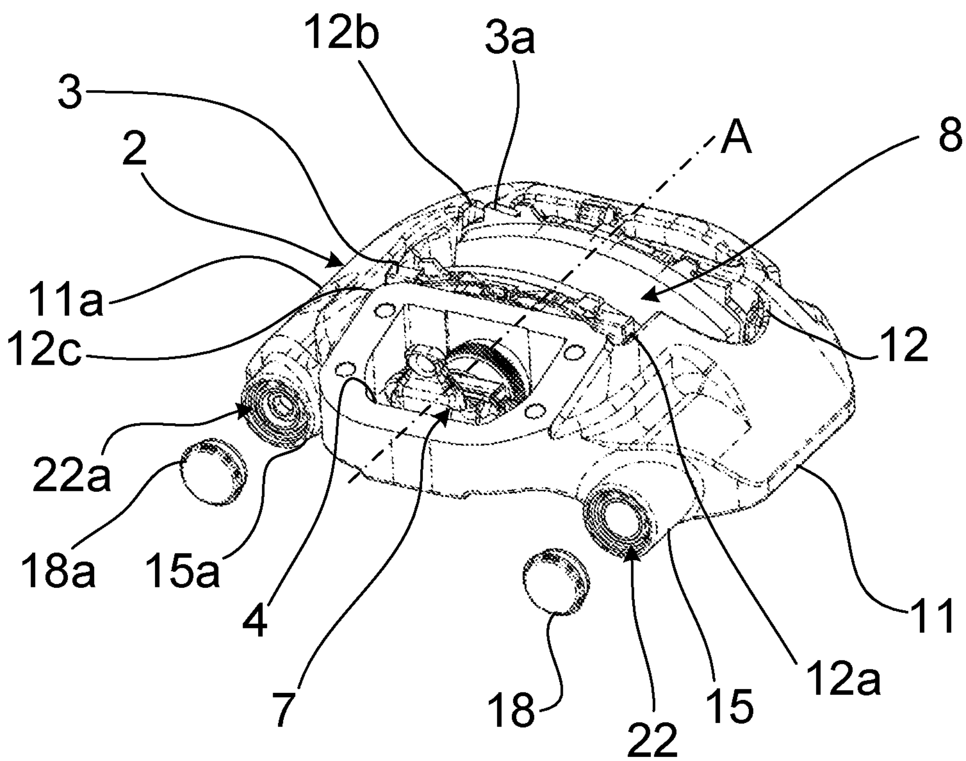
FIG. 4 is another perspective view of the disc brake according to FIG. 1 having the brake caliper according to FIGS. 1 and 3, 3*a*, 3*b*.

The brake caliper 2 additionally has two bolt guides 15, 15*a*, which are described in greater detail in FIG. 4. A degree of wear Y of the brake disc 6 is described in greater detail in FIG. 2, 2*a*.

Figure 2:
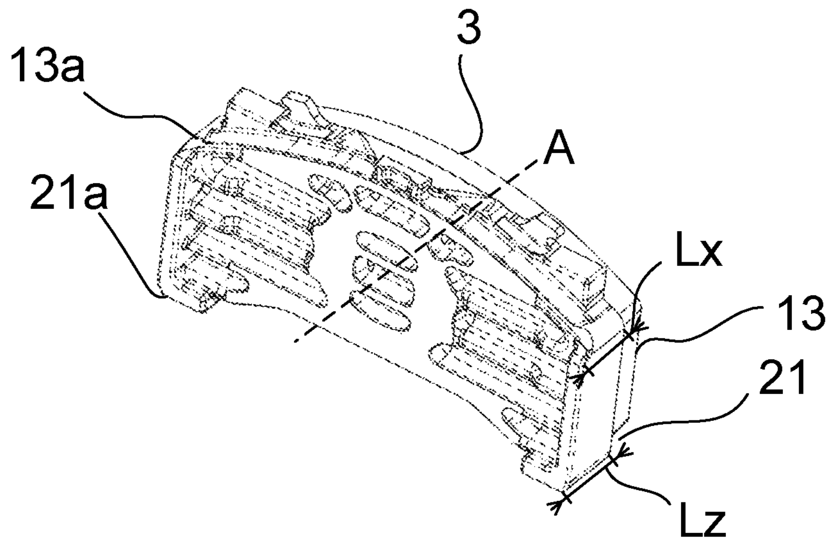
FIG. 2 is a perspective view of a clamping-side brake pad of the brake caliper according to FIG. 1.

A detailed view of the clamping-side brake pad 3 and of the reaction-side brake pad 3*a* is shown in FIG. 2 and FIG. 2*a*, respectively. The brake pad 3 has, on its perimeter, supporting surfaces 13, 13*a* and bearing surfaces 21, 21*a*, where the supporting surfaces 13, 13*a* are in contact perpendicularly (i.e. laterally) to the axial axis A of the brake caliper 2 (FIG. 1) with the lugs 9, 9*a* of the brake caliper (FIG. 1), and the bearing surfaces 21, 21*a*, are in contact radially (i.e. vertically) with the lugs 9, 9*a* (FIG. 1). Similarly, the brake pad 3*a* has, on its perimeter, supporting surfaces 13*b*, 13*c* and bearing surfaces 21*b*, 21*c*, wherein the supporting surfaces 13*b*, 13*c* are in contact perpendicularly (i.e. laterally) to the axial axis A of the brake caliper 2 (FIG. 1) with the lugs 9*b*, 9*c* of the brake caliper (FIG. 1) and the bearing surfaces 21*b*, 21*c* are in contact radially (i.e. vertically) with the lugs 9*bb*, 9*cc* (FIGS. 3 and 3*b*). The clamping-side brake pad 3 differs from the reaction-side brake pad 3*a* by the dimensioning of the bearing surfaces 21, 21*a*, 21*b*, 21*c* and of the supporting surfaces 13, 13*a*, 13*b*, 13*c*. By precisely positioning and arranging the brake pads 3, 3*a* on the lugs 9, 9*a*, 9*b*, 9*c*, 9*bb*, 9*cc* the brake pads 3, 3*a* are prevented from both canting and falling out of the brake caliper 2.

In the case of the clamping-side brake pad 3, the axial length Lx of the supporting surfaces 13, 13*a* is smaller than the axial length Ly of the lugs 9, 9*a* (FIG. 1). The axial length Ly of the lugs 9, 9*a* is composed of the axial length Lx of the supporting surfaces 13, 13*a*, the degree of wear X of the reaction-side brake pad 3*a* and the degree of wear Y (FIG. 1) of the brake disc 6. An axial length Lz of the bearing surface 21, 21*a* corresponds to the axial length Ly of the lugs 9, 9*a* (FIG. 1). In the case of the reaction-side brake pad 3*a*, an axial length $Lx_1$ of the supporting surfaces 13*b*, 13*c* corresponds to the axial length $Ly_1$ of the lugs 9*b*, 9*c* (FIG. 1), and an axial length $Lz_1$ of the bearing surface 21*b*, 21*c* corresponds to the axial length $Ly_1$ of the lugs 9*bb*, 9*cc* (FIG. 1).

Figure 3A:
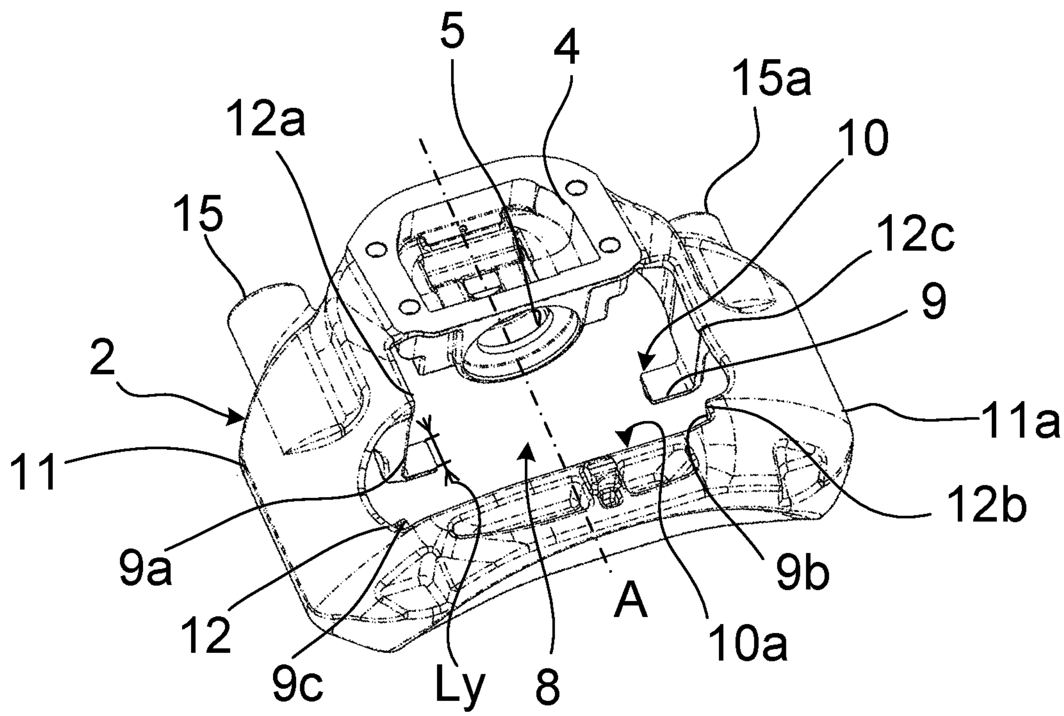
FIG. 3*a* is another perspective view of the brake caliper of the disc brake according to FIG. 1.
Figure 3B:
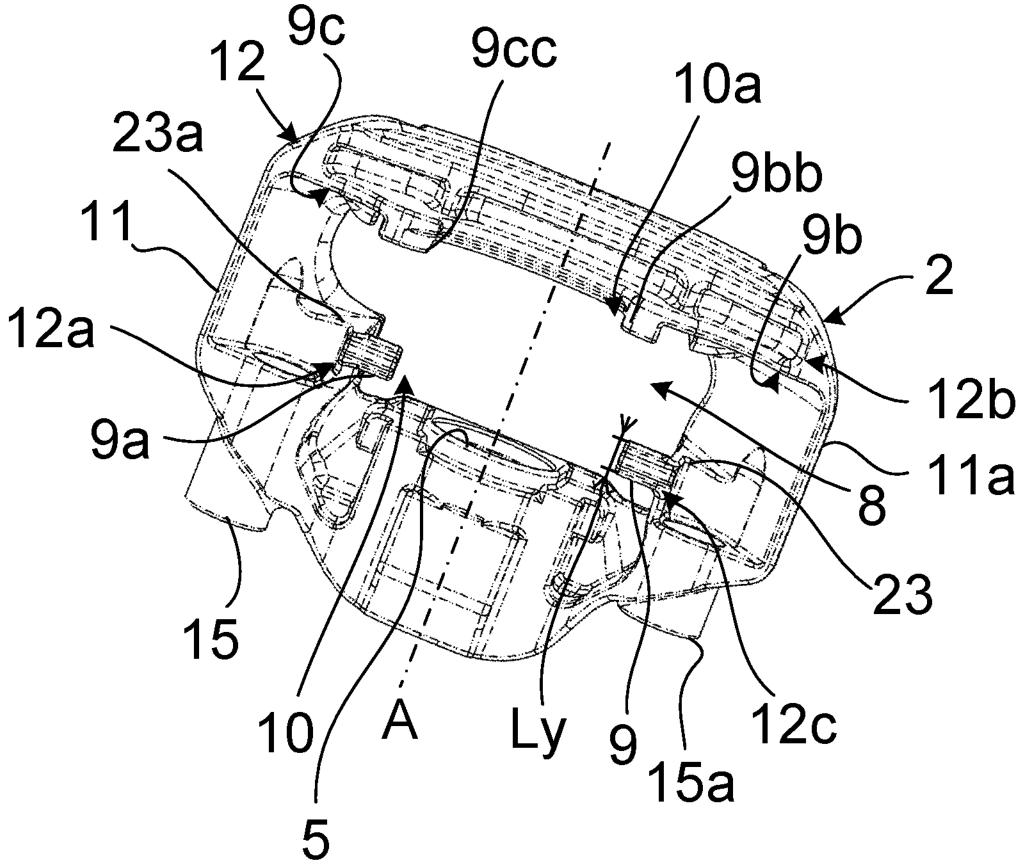
FIG. 3*b* is yet another perspective view of the brake caliper of the disc brake according to FIG. 1.

FIG. 3, 3*a*, 3*b* show three views of the brake caliper 2 of the disc brake 1 according to FIG. 1 to FIG. 2*a*, but without brake pads 3, 3*a*. In particular, the L-shaped form of the clamping-side lugs 9, 9*a* is shown.

Furthermore, the axial lengthening of the clamping side lugs 9, 9*a*, as compared to the reaction-side lugs 9*b*, 9*bb*, 9*c*, 9*cc*, by the pad wear X of the brake pad 3*a* (FIG. 1, FIG. 2, FIG. 2*a*) can be seen particularly clearly.

In FIG. 4, the arrangement of the bolt guide cap 18 of the bolt guide 15 and the arrangement of the bolt guide cap 18*a* of the bolt guide 15*a* is shown. The bolt guide cap 18 is screwed to the bolt guide 15, axially in the direction of the clamping device 7, via a thread 22 of the bolt guide 15, and the further bolt guide cap 18*a* is screwed to the bolt guide 15*a*, axially in the direction of the clamping device 7, via a thread 22*a* of the bolt guide 15*a*. For illustrative purposes, a bolt screw 16 for connection to a vehicle axle, not shown, is shown in the bolt guide 15*a*. For mounting of the disc brake 1 on the vehicle axle, not shown, the bolt screw 16 is screwed out of the bolt guide 15*a* once the bolt guide cap 18*a* has been unscrewed from the bolt guide 15. The bolt screw 16 is then screwed into the bolt guide 15 again.

While the above description constitutes the preferred embodiments of the present invention, it will be appreciated that the invention is susceptible to modification, variation and change without departing from the proper scope and fair meaning of the accompanying claims.

The invention claimed is:

1. A disc brake (1) for vehicles, the disc brake comprising:

a brake caliper (2), a clamping-side brake pad (3), and a reaction-side brake pad (3*a*) for clamping a brake disc (6) in a direction along an axial axis (A), wherein the brake caliper is a sliding brake caliper, wherein the brake caliper position relative to the brake disc shifts in response to brake pad wear;

wherein the brake caliper (2) defines a first inside space (4) for receiving a clamping device (7), the first inside space (4) having an opening (5) on a side facing the brake disc (6), wherein the brake caliper (2) defines a second inside space (8) for receiving the brake disc (6), wherein the brake caliper (2) includes, in the second inside space (8), clamping-side lugs (9, 9*a*) on opposite sides of the second inside space for receiving the clamping-side brake pad (3) and reaction-side lugs (9*b*, 9*bb*, 9*c*, 9*cc*) on opposite sides of the second inside space for receiving the reaction-side brake pad (3*a*);

wherein the second inside space is open at the top and bottom thereof, wherein the brake caliper is free from structure extending axially across the top of the second inside space, such that the top of the second inside space is defined by an outer perimeter when viewed vertically, wherein the brake pads are insertable vertically through the outer perimeter;

wherein at least a bottom portion of the clamping-side lugs (9, 9*a*) are disposed below a bottom-most edge of a backing plate of a clamping side brake pad and supports the bottom-most edge when the clamping side brake pad is inserted in the second inside space;

wherein at least two reaction-side lugs are lower reaction-side lugs disposed below a bottom-most edge of a backing plate of a reaction side brake pad and support the reaction side brake pad when the reaction side brake pad is inserted in the second inside space;

wherein the lower reaction side lugs are on opposite lateral sides of the axial axis (A) and a pair of upper reaction-side lugs are disposed on opposite lateral sides of the axial axis (A);

wherein the lower reaction-side lugs are spaced apart laterally, and the upper reaction side lugs are disposed laterally outward relative to the lower reaction side lugs such that the pair of lower reaction side lugs are laterally between the pair of upper reaction-side lugs;

wherein the upper reaction-side lugs support the reaction-side brake pad (3*a*) in a lateral direction of the disc brake (1) and the lower reaction-side lugs (9*bb*, 9*cc*) support the reaction side brake pad (3*a*) in a vertical direction of the disc brake (1), wherein the lower reaction-side lugs are disposed below a lower edge surface of the reaction-side brake pad and support a laterally outermost section of the lower edge surface of the reaction-side brake pad, wherein the reaction-side brake pad includes notches defined in upper corners on opposite lateral sides of the disc brake, wherein the upper reaction-side lugs are disposed in the notches and above the notches.

2. The disc brake (1) as claimed in claim 1, wherein the clamping-side lugs (9, 9*a*) are arranged opposite one another and form a clamping-side pad carrier channel (10) between side portions of the clamping side lugs for receiving the clamping-side brake pad (3), and wherein at least two of the reaction-side lugs (9*b*, 9*bb*, 9*c*, 9*cc*) are arranged opposite one another and form a reaction-side pad carrier channel (10*a*) for receiving the reaction-side brake pad (3*a*).

3. The disc brake (1) as claimed in claim 1, wherein the brake caliper (2) has first and second axial cross-members (11, 11*a*), and two sub-regions (12, 12*a*) of the first axial cross-member (11) located in the area of the second inside space (8) include one of the clamping side lugs and one of the reaction side lugs (9*a*, 9*c*) and two sub-regions (12*b*, 12*c*) of the second axial cross-member (11*a*) located in the area of the second inside space (8) include one of the clamping side lugs and one of the reaction side lugs (9, 9*b*), wherein each of the clamping side lugs and the reaction side lugs disposed in the two sub-regions of each of the first and second axial cross-members are disposed below an upper-most surface of the corresponding sub-regions.

4. The disc brake (1) as claimed in claim 2, wherein the clamping side lugs (9, 9*a*) are L-shaped and include the bottom portion extending inwardly relative to a side portion.

5. The disc brake (1) as claimed in claim 1, wherein the brake caliper (2) and the lugs (9, 9*a*; 9*b*, 9*bb*, 9*c*, 9*cc*) are formed from one component.

6. The disc brake (1) as claimed in claim 5, wherein the component is a cast part, an aluminum component, or a component formed from a composite material.

7. The disc brake (1) as claimed in claim 1, wherein the first inside space (4) is configured to receive an axially arranged clamping device (7).

8. The disc brake as claimed in claim 1, wherein the clamping-side brake pad (3) has, on a perimeter thereof, supporting surfaces (13, 13*a*) and bearing surfaces (21, 21*a*) for arrangement on the clamping-side lugs (9, 9*a*), and wherein the reaction-side brake pad (3*a*) has, on a perimeter thereof, supporting surfaces (13*b*, 13*c*) and bearing surfaces (21*b*, 21*c*) for arrangement on the reaction-side lugs (9*b*, 9*bb*, 9*c*, 9*cc*);

wherein the bottom portion of the clamping side lugs are disposed below and support the bearing surfaces of the clamping side brake pad and the at least two reaction side lugs are disposed below and support the bearing surfaces of the reaction-side brake pad.

9. The disc brake (1) as claimed in claim 8, wherein the supporting surfaces (13, 13*a*) of the clamping-side brake pad (3) lie vertically and perpendicularly to the axial axis (A) on the clamping-side lugs (9, 9*a*) and the bearing surfaces (21, 21*a*) of the clamping side brake pad (3) lie horizontally on the clamping side lugs (9, 9*a*), and wherein the supporting surfaces (13*b*, 13*c*) of the reaction-side brake pads (3*a*) lie vertically and perpendicularly to the axial axis (A) on the reaction-side lugs (9*b*, 9*c*) and wherein the bearing surfaces (21*b*, 21*c*) of the clamping-side brake pad (3*a*) lie horizontally on the reaction-side lugs (9*b*, 9*bb*, 9*c*, 9*cc*).

10. The disc brake (1) as claimed in claim 8, wherein an axial length (Lx) of the supporting surfaces (13, 13*a*) of the clamping-side brake pad (3) is smaller than an axial length (Ly) of the clamping-side lugs (9, 9*a*).

11. The disc brake (1) as claimed in claim 10, wherein the axial length (Ly) of the clamping-side lugs (9, 9*a*) is defined by the sum of the axial length (Lx) of the supporting surfaces (13, 13*a*) of the clamping-side brake pad (3), a degree of wear (X) of the reaction-side brake pad (3*a*) and a degree of wear (Y) of the brake disc (6).

12. The disc brake (1) as claimed in claim 1, wherein the brake caliper (2) includes a bolt guide (15, 15*a*) having a bolt guide cap (18, 18*a*) arranged coaxially on the bolt guide (15, 15*a*) of the brake caliper (2).

13. The disc brake (1) as claimed in claim 12, wherein the bolt guide cap (18, 18*a*) is fastened to the bolt guide (15, 15*a*) via a screw connection or a clip connection.

14. A disc brake (1) for vehicles, the disc brake comprising:

a brake caliper (2), a clamping-side brake pad (3), and a reaction-side brake pad (3*a*) for clamping a brake disc (6) in a direction along an axial axis (A), wherein the brake caliper is a sliding brake caliper, wherein the brake caliper position relative to the brake disc shifts in response to brake pad wear;

wherein the brake caliper (2) defines a first inside space (4) for receiving a clamping device (7), the first inside space (4) having an opening (5) on a side facing the brake disc (6), wherein the brake caliper (2) defines a second inside space (8) for receiving the brake disc (6), wherein the brake caliper (2) includes, in the second inside space (8), clamping-side lugs (9, 9*a*) on opposite sides of the second inside space for receiving the clamping-side brake pad (3) and reaction-side lugs (9*b*, 9*bb*, 9*c*, 9*cc*) on opposite sides of the second inside space for receiving the reaction-side brake pad (3*a*);

wherein the second inside space is open at the top and bottom thereof, wherein the brake caliper is free from structure extending axially across the top of the second inside space, such that the top of the second inside space is defined by an outer perimeter when viewed vertically, wherein the brake pads are insertable vertically through the outer perimeter;

wherein at least a bottom portion of the clamping-side lugs (9, 9*a*) are disposed below a bottom-most edge of a backing plate of a clamping side brake pad and supports the bottom-most edge when the clamping side brake pad is inserted in the second inside space;

wherein at least two reaction-side lugs are disposed below a bottom-most edge of a backing plate of a reaction side brake pad and support the reaction side brake pad when the reaction side brake pad is inserted in the second inside space wherein the reaction side lugs (9*b*, 9*c*, 9*bb*, 9*cc*) include a pair of first reaction-side lugs (9*b*, 9*c*) on opposite lateral sides of the axial axis (A) and a pair of second reaction-side lugs (9*bb*, 9*cc*) on opposite lateral sides of the axial axis (A), wherein the first reaction-side lugs are upper reaction side lugs and the second reaction-side lugs are lower reaction side lugs;

wherein the lower reaction-side lugs are spaced apart laterally, and the upper reaction side lugs are disposed laterally outward relative to the lower reaction side lugs such that the pair of lower reaction side lugs are laterally between the pair of upper reaction-side lugs;

wherein the upper reaction-side lugs support the reaction-side brake pad (3*a*) in a lateral direction of the disc brake (1) and the lower reaction-side lugs (9*bb*, 9*cc*) support the reaction side brake pad (3*a*) in a vertical direction of the disc brake (1), wherein the lower reaction-side lugs are disposed below a lower edge surface of the reaction-side brake pad and support a laterally outermost section of the lower edge surface of the reaction-side brake pad, wherein the reaction-side brake pad includes notches defined in upper corners on opposite lateral sides of the disc brake, wherein the upper reaction-side lugs are disposed in the notches and above the notches.

15. The disc brake (1) as claimed in claim 14, wherein the first and second reaction side lugs (9*b*, 9*bb*) on a first lateral side of the axial axis (A) support a first lateral side of the reaction-side brake pad (3*a*) and the first and second reaction side lugs (9*c*, 9*cc*) on a second lateral side of the axial axis (A) support a second lateral side of the reaction-side brake pad (3*a*).

16. The disc brake (1) as claimed in claim 14, wherein the first reaction side lugs (9*b*, 9*c*) are arranged at a transverse angle relative to the second reaction-side lugs.

17. The disc brake (1) as claimed in claim 16, wherein the transverse angle is a 90 degree angle.

18. The disc brake (1) as claimed in claim 16, wherein the transverse angle matches an angle as measured between a bearing surface (21*b*, 21*c*) and a support surface (13*b*, 13*c*) of the reaction-side brake pad.

19. The disc brake (1) as claimed in claim 14, wherein the first reaction-side lugs (9*b*, 9*c*) and the second reaction-side lugs (9*bb*, 9*cc*) combine to define a pair of L-shapes.

* * * * *